United States Patent
Harada et al.

(10) Patent No.: US 8,894,113 B2
(45) Date of Patent: Nov. 25, 2014

(54) ROBOT HAND AND ROBOT

(71) Applicant: Kabushiki Kaisha Yaskawa Denki, Kitakyushu (JP)

(72) Inventors: Toshiyuki Harada, Kitakyushu (JP); Kenichi Motonaga, Kitakyushu (JP); Keigo Ishibashi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 14/157,528

(22) Filed: Jan. 17, 2014

(65) Prior Publication Data
US 2014/0203582 A1    Jul. 24, 2014

(30) Foreign Application Priority Data
Jan. 22, 2013    (JP) .................................. 2013-009435

(51) Int. Cl.
*B25J 15/00*    (2006.01)
(52) U.S. Cl.
CPC .............. *B25J 15/0023* (2013.01); *B25J 15/00* (2013.01); *B25J 15/0028* (2013.01); *Y10S 901/31* (2013.01)
USPC .................. 294/87.1; 294/2; 294/213; 901/31

(58) Field of Classification Search
USPC ............. 294/87.1, 119.1, 2, 213, 86.4, 87.26, 294/192, 207; 901/37, 30, 31, 32, 36, 39, 901/40; 269/24, 27, 32, 33, 34, 37, 44
See application file for complete search history.

(56) References Cited

U.S. PATENT DOCUMENTS

| 5,050,919 A | * | 9/1991 | Yakou ................................ 294/2 |
| 5,284,413 A | * | 2/1994 | Wilkinson et al. ................. 294/2 |
| 5,374,158 A | * | 12/1994 | Tessier et al. .................. 414/759 |
| 5,562,320 A | * | 10/1996 | Bloomberg et al. ........ 294/119.1 |
| 6,015,174 A | * | 1/2000 | Raes et al. .................. 294/119.1 |

FOREIGN PATENT DOCUMENTS

JP    2003-159687    6/2003

* cited by examiner

*Primary Examiner* — Paul T Chin
(74) *Attorney, Agent, or Firm* — Mori & Ward, LLP

(57) ABSTRACT

A robot hand is provided. The robot hand includes a plurality of holding parts provided to be holdable of a plurality of workpieces, respectively, and a pneumatic drive for protruding one of the holding parts, when the holding part holds one of the workpieces, toward the workpiece with respect to one or more remaining holding parts by pneumatic pressure.

8 Claims, 5 Drawing Sheets

ROBOT HAND AND ROBOT

CROSS-REFERENCE TO RELATED APPLICATION(S)

The application claims priority under 35 U.S.C. §119 to Japanese Patent Application No. 2013-009435, which was filed on Jan. 22, 2013, the entire disclosure of which is hereby incorporated by reference.

TECHNICAL FIELD

The disclosed embodiment relates to a robot hand and a robot.

BACKGROUND OF THE INVENTION

Conventionally, robots which perform predetermined operations such as assembling manufactural products by using a robot hand provided in the tip end of its arm have been known.

For example, such robots are configured as SCARA (Selective Compliance Assembly Robot Arm) robots having a robot arm provided with, for example, a chuck. The chuck is used to perform a manufacturing operation such as mounting an electronic component (e.g., capacitor) onto a substrate while grasping the electronic component.

Further, for the robot to efficiently perform the manufacturing operation and achieve a shorter manufacturing time, JP2003-159687A discloses a robot having a robot hand with a plurality of chucks.

Specifically, the robot provided in the "workpiece conveying equipment" disclosed in JP2003-159687A has a robot hand with a plurality of chucks that can be independently driven, and is configured to be simultaneously holdable of workpieces before and after being processed. Note that, the plurality of chucks are arranged substantially in a line, and the grasping directions of the workpieces are oriented in the arrayed direction (in other words, substantially in the same direction).

SUMMARY OF THE INVENTION

The disclosed embodiment is made in view of the above situation, and it provides a robot hand and a robot, that can surely prevent an interference even when there is a variety of workpieces.

A robot hand according to the disclosed embodiment includes a plurality of holding parts provided to be holdable of a plurality of workpieces, respectively, and a pneumatic drive for protruding one of the holding parts, when the holding part holds one of the workpieces, toward the workpiece with respect to one or more remaining holding parts by pneumatic pressure.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Hereinafter, one embodiment of a robot hand and a robot disclosed herein is described in detail referring to the appended drawings. Note that, the invention is not limited by the embodiment described below.

Also, hereinafter, an assembly robot for mounting electronic components such as capacitors onto a substrate is described as an example. The assembly robot is simply referred to as "the robot." "The robot hand" which is an end effecter, is referred to as "the hand."

Further, the electronic component to be mounted onto the substrate is referred to as "the workpiece." When there are different kinds of components, numerals are assigned after a character "W" such as "W+number" (i.e., workpiece W1, W2, etc.). However, when collectively mentioning the entire workpiece regardless of the kinds, the character "W" is solely assigned.

Figure 1A:
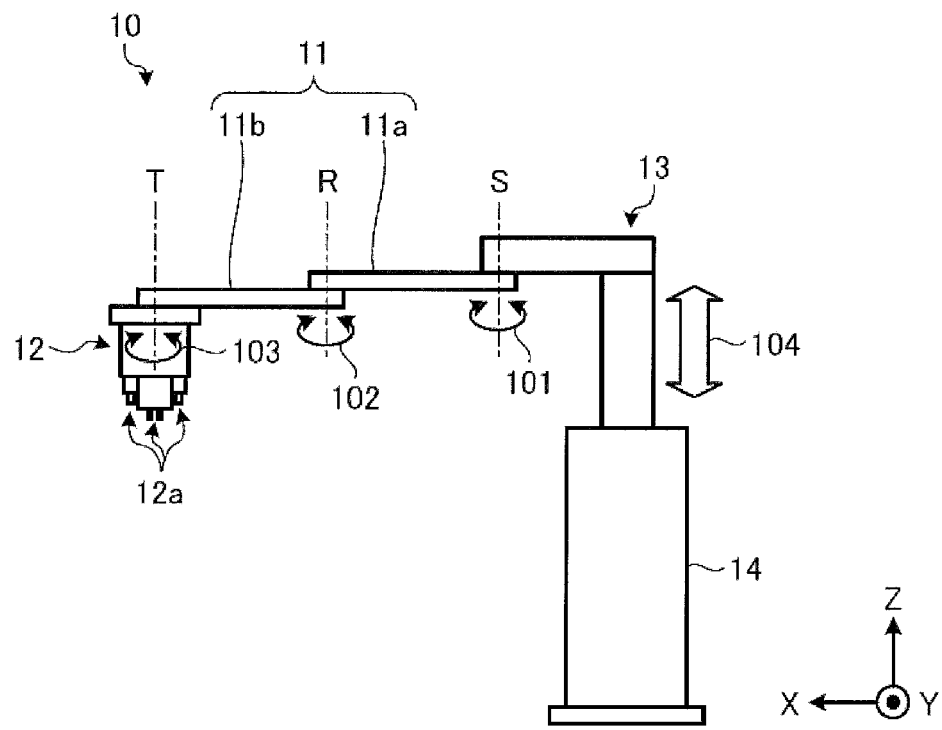
FIG. 1A is a schematic side view illustrating a configuration of a robot according to one embodiment.

First, a configuration of a robot 10 according to this embodiment is described referring to FIG. 1A. FIG. 1A is a schematic side view illustrating a schematic configuration of the robot 10 according to this embodiment.

Note that, in order to clarify the description, as illustrated in FIG. 1A, a three-dimensional rectangular coordinate system including a Z-axis which indicates a vertically upward direction as a positive direction and a vertically downward direction as a negative direction, is illustrated. Accordingly, directions along an XY plane indicate "horizontal directions." Such a rectangular coordinate system may be illustrated in other drawings as well to be used in the following descriptions.

Further, hereinafter, if one component is comprised of a plurality of elements, one or some of the elements may be indicated with symbols, which may include one or more characters and/or one or more numerals, and symbols for the rest of the elements may be omitted. In that case, the elements indicated with and without symbols have similar configurations.

As illustrated in FIG. 1A, the robot 10 is a SCARA (Selective Compliance Assembly Robot Arm) robot provided with an arm part 11 that operates horizontally. Specifically, the robot 10 includes the arm part 11, a hand 12, an arm base 13, and a pedestal part 14.

The hand 12 is an end effector provided on a tip end portion of the arm part 11. The arm base 13 is a base portion of the arm part 11, which supports the arm part 11 to be horizontally turnable. Further, the arm part 11 includes a first arm 11a and a second arm 11b.

The first arm 11a is coupled to the arm base 13 at a base end portion thereof so that the first arm 11a is turnable about an axis S (refer to a bidirectional arrow 101 in FIG. 1A). The second arm 11b is coupled to the first arm 11a at a base end portion thereof so that the second arm 11b is turnable about an axis R (refer to a bidirectional arrow 102 in FIG. 1A).

Further, the hand 12 is coupled to the second arm 11b at a tip end portion thereof so that the hand 12 is turnable about an axis T (refer to a bidirectional arrow 103 in FIG. 1A). The hand 12 includes a plurality of chucks 12a each provided with a tip end portion facing vertically downward, and the chucks 12a are used to grasp the electronic components, respectively. Note that, a detailed configuration of the hand 12 including the chucks 12a is described later referring to FIG. 2A and the subsequent drawings.

Note that, the arm base 13 is slidably provided to the pedestal part 14 in vertical directions (in other words, Z-axis directions) (refer to a bidirectional arrow 104 in FIG. 1A). Hereinafter, such sliding operation in the vertical direction(s) may be referred to as "the Z-axis operation" of the robot 10.

The pedestal part 14 is a unit that supports the arm base 13, and slides the arm base 13 in the vertical directions, in other words, performs the "Z-axis operations" of the robot 10.

Figure 1B:
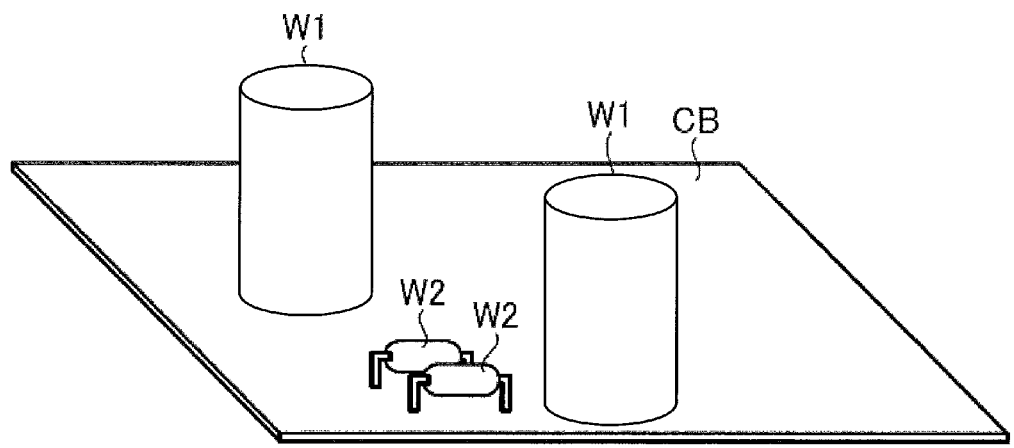
FIG. 1B is a schematic view illustrating one example of a manufactural product to be manufactured by the robot.

Here, a manufacturing operation which the robot 10 performs is briefly described. FIG. 1B is a schematic view illustrating one example of a manufactural product to be manufactured by the robot.

For example, as illustrated in FIG. 1B, the robot 10 performs the manufacturing operation for mounting the electronic components such as the workpieces W1 and the workpieces W2 onto a substrate CB. Note that, as illustrated in FIG. 1B, the workpieces W1 and the workpieces W2 are normally different in shapes and sizes when they are capacitors and resistors, for example.

Here, the robot 10 includes a plurality of chucks 12a having different preset grasping widths and the like depending on the shapes and sizes of the workpieces. By selectively using (switching) one of the chucks 12a to independently grasp the workpiece W1 or W2, the operation can be done more efficiently.

However, as illustrated in FIG. 1B, for example, when mounting the workpiece W2 onto the substrate CB, if obstructions such as the workpieces W1 exist in a near location, the chuck 12a grasping the workpiece W2 may interfere with the obstructions. Therefore, it is important to increase an efficiency of the operation using the plurality of chucks 12a and surely prevent the interference of the hand 12 with the obstructions.

For this reason, in this embodiment, the hand 12 includes the plurality of chucks 12a that can grasp the plurality of workpieces W, respectively, and when one of the chucks 12a grasps a workpiece W, the chuck 12a is protruded with respect to the other chuck(s) 12a. Pneumatic pressure is applied for such protrusion.

Moreover, in this embodiment, the plurality of chucks 12a are arranged in a circumferential direction about the axis T which is a rotational axis of the hand 12 (in other words, a rotational axis of all the chucks). Hereinafter, a detailed configuration of the hand 12 is specifically described referring to FIG. 2A and the subsequent drawings.

Figure 2A:
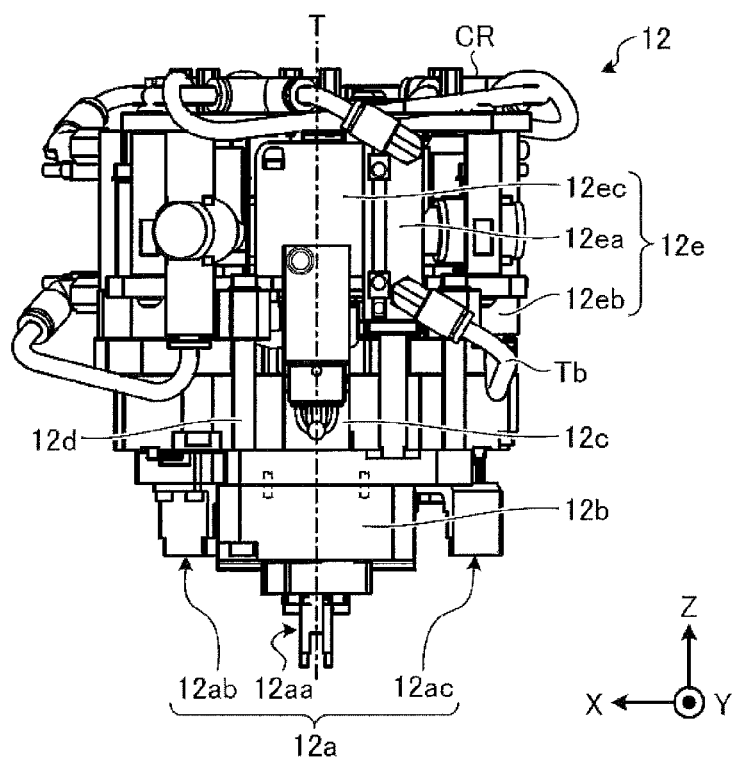
FIG. 2A is a schematic front view illustrating a configuration of a robot hand according to the embodiment.
Figure 2B:
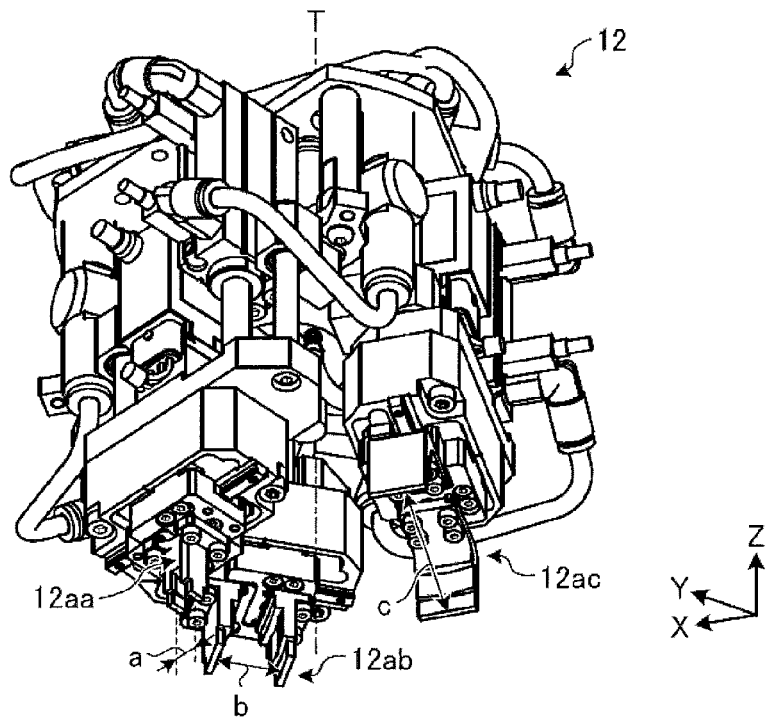
FIG. 2B is a schematic perspective view illustrating the configuration of the robot hand according to the embodiment.

FIG. 2A is a schematic front view illustrating the configuration of the hand 12, and FIG. 2B is a schematic perspective view illustrating the configuration of the hand 12. As illustrated in FIG. 2A, the hand 12 includes the plurality of chucks 12a. Each of the chucks 12a has the tip end portion facing vertically downward.

Note that, in this embodiment, three chucks 12a are provided, and each of the chucks are indicated as a first chuck 12aa, a second chuck 12ab, and a third chuck 12ac. However, this is not to limit the number of chucks 12a as long as at least two or more chucks 12a are provided.

Here, as illustrated in FIG. 2B, for example, the first chuck 12aa to the third chuck 12ac can have different configurations such as different grasping widths a to c.

The grasping widths a to c are defined depending on the shapes and sizes of the workpieces W to be handled. Note that, in the example illustrated in FIG. 2B, a relation of the grasping widths a to c of the first chuck 12aa to the third chuck 12ac is "a<b<c."

On the other hand, the configurations of the first chuck 12aa to the third chuck 12ac do not necessary need to be different from each other. For example, the process operation time can be shortened by using the first chuck 12aa to the third chuck 12ac having the same configuration to grasp a large number of workpieces W all having the same shape. However, note that in this embodiment, descriptions are made supposing that configurations of the first chuck 12aa to the third chuck 12ac are to be different from each other.

Further, as illustrated in FIG. 2B, the first chuck 12aa to the third chuck 12ac are arranged in the circumferential direction of the axis T (which is the rotational axis of the hand 12) substantially parallel to the vertical direction. Details of the arranging relation of the first chuck 12aa to the third chuck 12ac are described later referring to FIGS. 4A and 4B.

Returning to FIG. 2A, the hand 12 further includes a chuck drive 12b, a chuck driving source 12c, a guide shaft 12d, and a pneumatic drive 12e. The pneumatic drive 12e includes air cylinders 12ea, shuttle valves 12eb, and an electromagnetic valve 12ec.

The chuck drive 12b is a mechanism coupled to a base end portion of each chuck 12a, and opens and closes a set of chuck claws of the chuck 12a, which is for example includes a rack-and-pinion mechanism. The opening and closing mechanism is driven by a driving force of the chuck driving source 12c coupled to the chuck drive 12b.

Moreover, the chuck drive 12b has a built-in guide mechanism which is used when the chuck drive 12b slides along the guide shaft 12d.

The air cylinder 12ea is a mechanical component coupled to each chuck 12a via the chuck drive 12b, and converts energy of compressed air into a linear motion to slide the chuck 12a along the guide shaft 12d. Further, the air cylinder 12ea is configured as a double-action type having two or more ports.

Note that, here, each air cylinder 12ea has two ports including an "OUT" port for vertically pushing down the chuck 12a and an "IN" port for vertically pushing up the chuck 12a. Description is made specifically later referring to FIG. 3A.

Further, the shuttle valve 12eb illustrated in FIG. 2A is a directional control valve coupled to each air cylinder 12ea and switches a flow direction of pneumatic pressure supplied to the air cylinder 12ea.

Specifically, the shuttle valve 12eb has two inlets and two outlets; the outlet is connected with either one of the inlets by a pressure difference of pneumatic pressures supplied from the two inlets. Note that, in this embodiment, the outlets of the shuttle valve 12eb are always connected to the inlet on the high pressure side. The description of the shuttle valve 12eb is also made later referring to FIG. 3A.

The electromagnetic valve 12ec is a unit for controlling the switching of the flow direction of the pneumatic pressure by the shuttle valve 12eb to exclusively or selectively protrude one of the chucks 12a. Specifically, the electromagnetic valve 12ec turns ON/OFF each port of a pneumatic pressure signal system line to control the switching of the flow direction of the pneumatic pressure by the shuttle valve 12eb. The description of the electromagnetic valve 12ec is also made later referring to FIG. 3A.

The air cylinder 12ea, the shuttle valve 12eb, and the electromagnetic valve 12ec, constituting the pneumatic drive 12e, are connected to each other via connecting members such as suitable tubes Tb and cross-fittings CR.

Figure 3A:
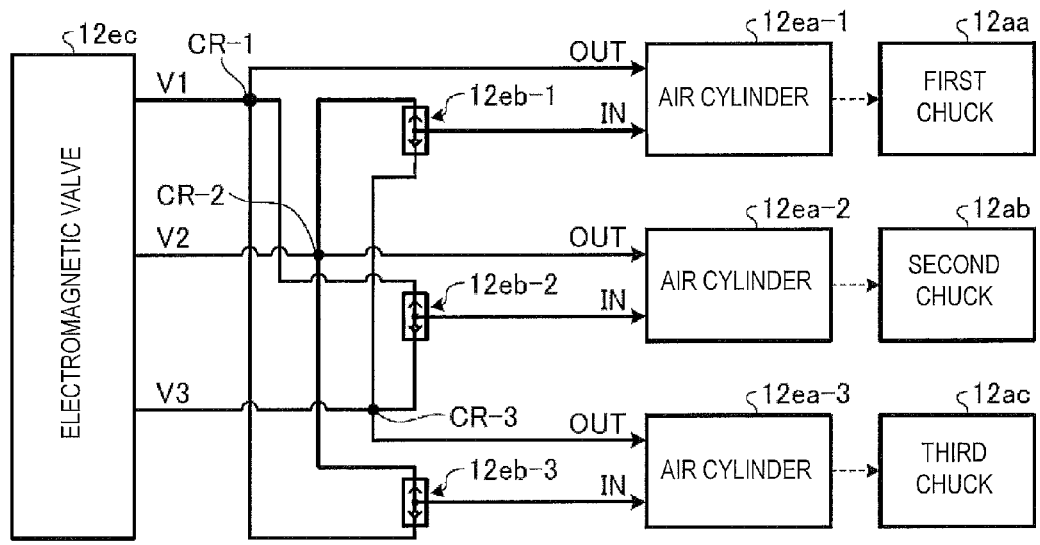
FIG. 3A is a diagram illustrating a connecting configuration of pneumatic drives.
Figure 3B:
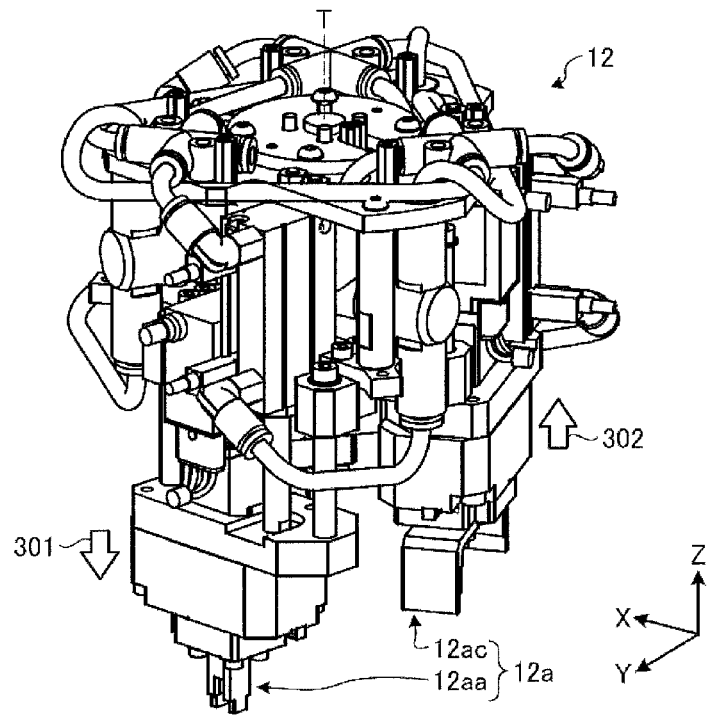
FIG. 3B is a schematic perspective view illustrating operations of chucks interlocking with operations of the pneumatic drives.

Next, a connecting configuration of the pneumatic drives 12e is described referring to FIG. 3A, and the operations of the chucks 12a interlocking with the operation of the pneumatic drive 12e are described referring to FIG. 3B.

FIG. 3A is a diagram illustrating the connecting configuration of the pneumatic drives 12e. FIG. 3B is a schematic perspective view illustrating the operations of the chucks 12a interlocking with the operations of the pneumatic drives 12e.

Note that, in FIG. 3A, the air cylinders 12ea, the shuttle valves 12eb, and the cross-fittings CR in the first chuck 12aa group have "-1" suffixed to each symbol thereof, the second chuck 12ab group has "-2", and the third chuck 12ac group has "-3."

Further, in FIG. 3A, although the electromagnetic valve 12ec is a three-way port electromagnetic valve having three ports, this is not to limit the number of ports. Moreover, here, the first chuck 12aa group is mainly described, and the descriptions of the second chuck 12ab and the third chuck 12ac are simplified as having similar configurations.

Further, in FIG. 3B, the second chuck 12ab is hidden, while the first chuck 12aa and the third chuck 12ac among the chucks 12a are illustrated.

As shown in FIG. 3A, the electromagnetic valve 12ec has valves V1 to V3 which are respectively coupled to the three ports. A passage for supplying pneumatic pressure from the valve V1 is connected to the "OUT" port of the air cylinder 12ea-1 coupled to the first chuck 12aa.

Further, the pneumatic pressure supply passage from the valve V1 is branched via a cross-fitting CR-1, and each branched passage is connected to one of the inlets of a shuttle valve 12eb-2 and one of the inlets of a shuttle valve 12eb-3.

In such a connecting configuration shown in FIG. 3A, when the port of the electromagnetic valve 12ec connected to the valve V1 is turned ON, the electromagnetic valve 12ec supplies pneumatic pressure which is defined in advance for high pressure to the group of valve V1. Note that, the high pneumatic pressure is preferred to be about 0.5 MPa (Mega Pascal).

On the other hand, at this time, the ports of the electromagnetic valve 12ec connected to the valve V2 and the valve V3 are turned OFF. That means, the groups of the valve V2 and the valve V3 become relatively low pressure with respect to the group of the valve V1, causing a pneumatic pressure difference.

Thus, in such a case, the "OUT" port of the air cylinder 12ea-1 which belongs to the group of the valve V1 is supplied with the high pneumatic pressure. Accordingly, as shown in FIG. 3B, the air cylinder 12ea-1 vertically pushes down the first chuck 12aa (refer to an arrow 301 in FIG. 3B).

In addition, in such a case, the "IN" ports of the air cylinders 12ea-2 and 12ea-3 are supplied with the high pneumatic pressure via the shuttle valves 12eb-2 and 12eb-3, respectively, due to the pressure difference described above. Accordingly, the air cylinders 12ea-2 and 12ea-3, as shown in FIG. 3B, vertically push up the second chuck 12ab (not illustrated) and the third chuck 12ac, respectively (refer to an arrow 302 in FIG. 3B).

That is, out of the valves V1 to V3, only the port connected to the valve V1 is turned ON to be exclusively protruded toward the workpiece W side with respect to the other chucks such as the second chuck 12ab and the third chuck 12ac.

Similar to the case of the first chuck 12aa, according to the connecting configuration illustrated in FIG. 3A, in a case where the port of the electromagnetic valve 12ec connected to the valve V2 is turned ON, the second chuck 12ab is exclusively protruded toward the workpiece W side with respect to the other chucks such as the first chuck 12aa and the third chuck 12ac.

Further, similarly, when only the port of the electromagnetic valve 12ec connected to the valve V3 is turned ON, the third chuck 12ac is exclusively protruded toward the workpiece W side with respect to the other chucks such as the first chuck 12aa and the second chuck 12ab.

That is, by protruding only one chuck 12a to be used each time with respect to the other chucks 12a toward the workpiece W side, the chuck 12a can grasp and release the workpiece W without interfering with obstructions, even when the workpieces W are crowded and mixedly arranged or the workpieces W are to be placed in a narrow space.

Note that, as shown in the connecting configuration of FIG. 3A, by using the shuttle valves 12eb-1 to 12eb-3, an effect of preventing a reverse flow of the pneumatic pressure to be supplied can also be obtained.

Figure 4A:
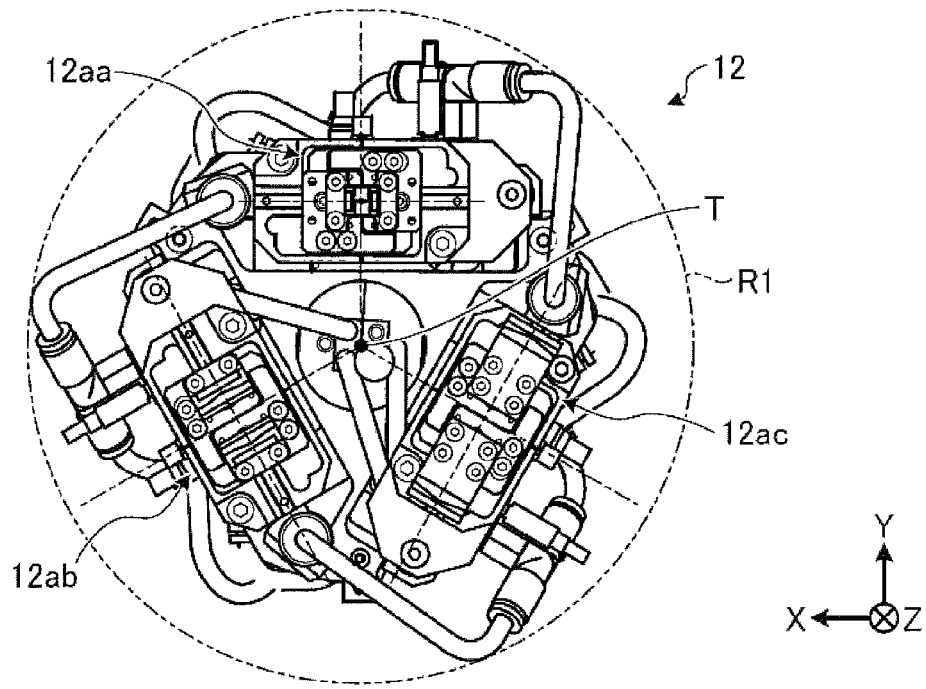
FIG. 4A is a schematic plan view illustrating an arranging relation of a first chuck to a third chuck.
Figure 4B:
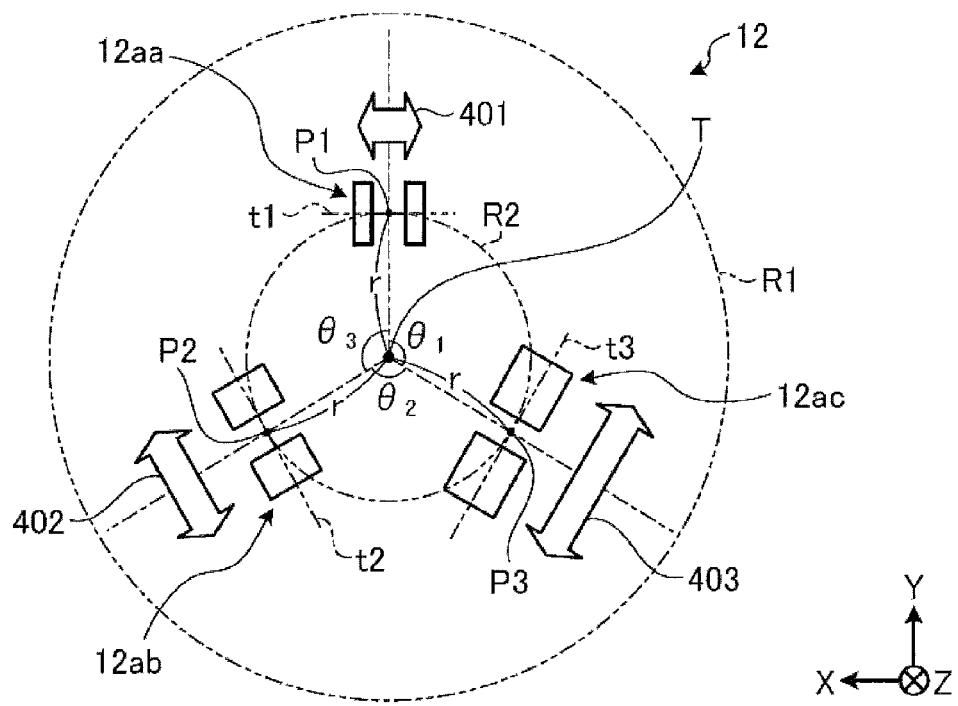
FIG. 4B is a schematic view illustrating FIG. 4A more simply.

Next, an arranging relation of the first chuck 12aa to the third chuck 12ac constituting the chucks 12a is described by using FIGS. 4A and 4B. FIG. 4A is a schematic plan view illustrating the arranging relation of the first chuck 12aa to the third chuck 12ac. FIG. 4B is a schematic view illustrating FIG. 4A more simply.

As already described above, as illustrated in FIG. 4A, the first chuck 12aa to the third chuck 12ac are arranged in a circumferential direction of the axis T which is the rotational axis of the hand 12. By this, the hand 12 can be compact and contribute in reducing its size.

In addition, since an increase of a turning radius R1 of when the hand 12 turns about the axis T is prevented, it can contribute in preventing the hand 12 from interfering with obstructions.

Hereinafter, by using FIG. 4B, a description is made more specifically. As shown in FIG. 4B, the first chuck 12aa to the third chuck 12ac are not only simply arranged in the circumferential direction of the shaft T, but also in a plan view, respective controlling points P1 to P3 are preferably arranged on a circumference of an imaginary circle R2 drawn with the axis T as a center.

Note that, the controlling points P1 to P3 correspond to points of action of the first chuck 12aa to the third chuck 12ac, respectively (which are the parts grasping the workpieces W), and are calculated at a suitable timing during the operation of the robot 10.

By this, since the controlling points P1 to P3 of the first chuck 12aa to the third chuck 12ac can be calculated to be in equal distances (in other words, a radius r) from the axis T, the robot 10 can be operated without complicating the control.

In order to acquire such an effect, arranging angles $\theta_1$ to $\theta_3$ shown in FIG. 4B are preferred to be equal, in other words, the first chuck 12aa to the third chuck 12ac are preferred to be arranged at equal intervals on the circumference of the imaginary circle R2.

Further, it is preferred that the controlling points P1 to P3 of the first chuck 12aa to the third chuck 12ac are arranged on the circumference of the imaginary circle R2, and grasping directions 401 to 403 are oriented to be substantially parallel with tangential directions t1 to t3 at the controlling points P1 to P3 on the imaginary circle R2, respectively.

By this, for example, when a larger grasping width is needed according to the size of the workpiece W, within a range drawn by the turning radius R1, the chuck 12a can be replaced by another chuck that has a relatively larger gripping width to be used.

Therefore, since the enlarging of the turning radius R1 can be prevented, it can contribute in preventing the interference of the hand 12 with the obstructions. Moreover, it can apply to the variety of the workpiece W.

Figure 5A:
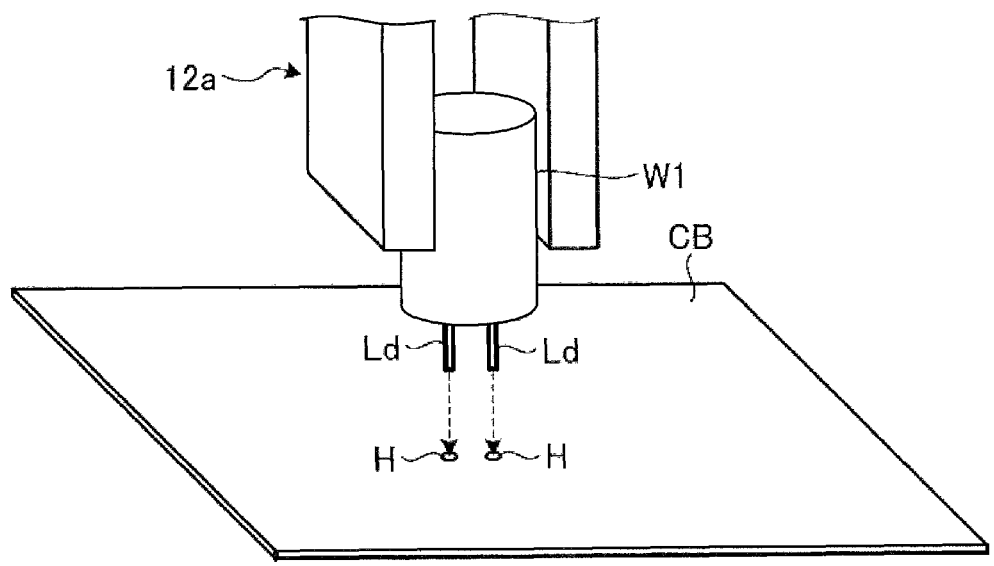
FIG. 5A is a first illustration of effects obtained by applying pneumatic pressure.
Figure 5B:
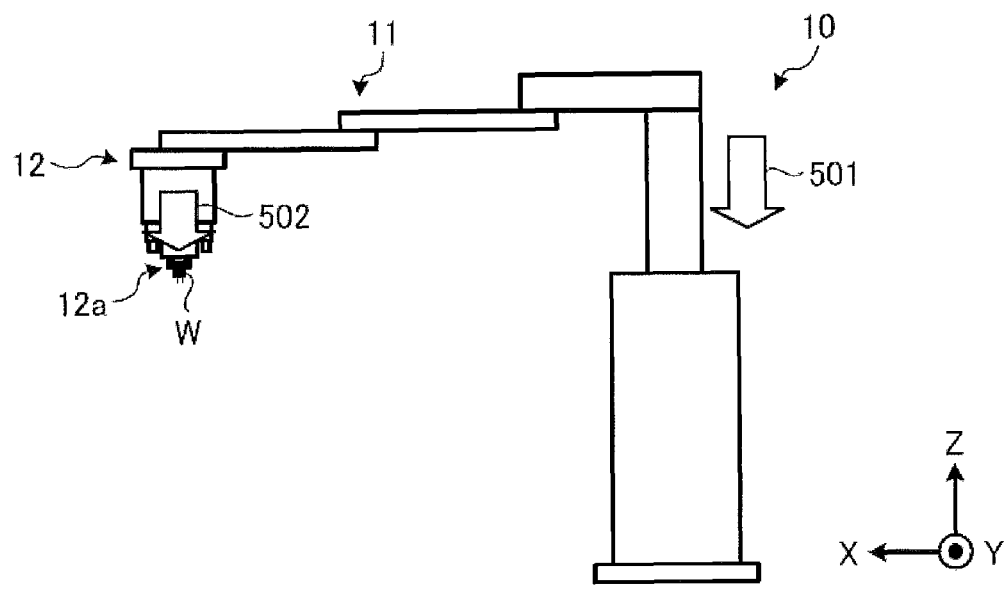
FIG. 5B is a second illustration of the effects obtained by applying the pneumatic pressure.

Next, effects that can be acquired from applying the pneumatic pressure to protrude the chuck 12a are described in detail referring to FIGS. 5A and 5B. FIGS. 5A and 5B are first and second illustrations of the effects obtained by applying the pneumatic pressure.

As shown in FIG. 5A, when mounting the workpiece W1 onto the substrate CB, for example, the robot 10 grasps the workpiece W1 by using one of the chucks 12a to perform an operation in which leads Ld extending from the workpiece W1 are inserted into holes H formed in the substrate CB. This operation is performed by the Z-axis operation of the robot 10.

At this time, since the chuck 12a is protruded by the driving of the pneumatic drive 12e, which means by the pneumatic pressure, it is in a state where a spring force acts by air which is an example of pneumatic fluid. Therefore, a shock of when inserting the leads Ld of the workpiece W1 into the holes H by the Z-axis operation of the robot 10 can be absorbed and reduced.

This can contribute in preventing unintentional damages to the electronic component such as the workpiece W1. Further, since the shock can be absorbed, the speed of the Z-axis operation of the robot 10 can be increased, and it can contribute in shortening the process operation time.

Moreover, by the chuck 12a being protruded by the pneumatic pressure, the Z-axis operation of the robot 10 can be assisted.

For example, suppose that the chuck 12a needs to fit the workpiece W into a predetermined fitting part while grasping the workpiece W.

In such a case, in order to fit the workpiece W, as shown in FIG. 5B, it is required for the robot 10 to perform the Z-axis operation with a predetermined push-in force (refer to an arrow 501 in FIG. 5B). Note that, at this time, the chuck 12a is in the state where the spring force acts to the chuck 12a by the driving of the pneumatic drive 12e.

Therefore, since the robot 10 can use the assist of the spring force (refer to an arrow 502 in FIG. 5B), it is unnecessary to fit the workpiece W with a predetermined pushing force by the Z-axis operation. Therefore, even when the robot 10 is a small and light-weight type, it can be prevented from the arm part 11 warping due to the pushing force only from the Z-axis operation.

As described above, the hand (robot hand) according to this embodiment includes the plurality of chucks and the pneumatic drive. The plurality of chucks are provided to be holdable of the plurality of workpieces independently. When one of the chucks holds the workpiece, the pneumatic pressure protrudes the chuck by the pneumatic pressure toward the workpiece side with respect to the other chucks.

Therefore, even when there are a variety of workpieces, the hand according to this embodiment can be surely prevented from interfering.

Note that, in the above embodiment, although the description is made with an example of when grasping the workpiece by the chuck, it is not to limit the kind of a handling tool. As long as the chuck can hold the workpiece, the handling may be done by, for example, suction or absorption. Therefore, the chuck may also be referred to as "the holding part."

Further in the above embodiment, although the SCARA (Selective Compliance Assembly Robot Arm) robot is used as an example, as long as the hand is provided on the tip end portion of the arm, and the hand can hold the workpiece by such a holding part, the kind of the robot is not limited.

Further in the above embodiment, although an example of when using the shuttle valve as the directional control valve is described, it is not limited to the shuttle valve.

Further in the above embodiment, although an example of when mounting the electronic components onto the substrate is described, the type of processing performed by the robot is not limited to this.

Further effects and modifications can be easily derived by one of ordinary skill in the art. Thus, modes of the invention in a wider scope should not be limited to the particular details above nor the representative embodiment illustrated and described. Therefore, various changes may be made to the above embodiment without departing from the comprehensive spirit or scope of the concept of the invention defined by the appended claims and any equivalents thereof

What is claimed is:

1. A robot hand, comprising:
a plurality of holding parts provided to be holdable of a plurality of workpieces, respectively; and
a pneumatic drive for protruding one of the holding parts, when the holding part holds one of the workpieces, toward the workpiece with respect to one or more remaining holding parts by pneumatic pressure,
wherein the pneumatic drive includes:
air cylinders coupled to the respective holding parts;
directional control valves coupled to the respective air cylinder and for switching flow directions of the pneumatic pressure supplied to the air cylinders; and
an electromagnetic valve for exclusively protruding the holding part by controlling the switching of the flow directions of the pneumatic pressure by the directional control valves,
wherein the directional control valve is a shuttle valve having two inlets and one outlet, and the outlet is connected to either one of the two inlets by a difference of the pneumatic pressures inputted from the two inlets.

2. The robot hand of claim 1, wherein the holding parts are respectively provided with a tip end portion thereof facing downward in a vertical direction and arranged in a circumferential direction about a rotational axis of the holding parts substantially parallel to the vertical direction.

3. The robot hand of claim 2, wherein the holding part is a chuck having a set of chuck claws for grasping the workpiece, and
wherein controlling points of the respective chucks are arranged on a circumference of an imaginary circle drawn with the rotational axis as a center in a plan view, and grasping directions of the chucks are oriented to be substantially parallel with tangential directions at the controlling points on the imaginary circle, respectively.

4. The robot hand of claim 3, wherein the chucks are arranged at equal intervals on the circumference of the imaginary circle.

5. A robot having a robot hand, the robot hand comprising:
a plurality of holding parts provided to be holdable of a plurality of workpieces, respectively; and
a pneumatic drive for protruding one of the holding parts, when the holding part holds one of the workpieces, toward the workpiece with respect to one or more remaining holding parts by pneumatic pressure, wherein the pneumatic drive includes:
- air cylinders coupled to the respective holding parts;
- directional control valves coupled to the respective air cylinder and for switching flow directions of the pneumatic pressure supplied to the air cylinders; and
- an electromagnetic valve for exclusively protruding the holding part by controlling the switching of the flow directions of the pneumatic pressure by the directional control valves, wherein the directional control valve is a shuttle valve having two inlets and one outlet, and the outlet is connected to either one of the two inlets by a difference of the pneumatic pressures inputted from the two inlets.

6. The robot of claim 5, wherein the holding parts are respectively provided with a tip end portion thereof facing downward in a vertical direction and arranged in a circumferential direction about a rotational axis of the holding parts substantially parallel to the vertical direction.

7. The robot of claim 6, wherein the holding part is a chuck having a set of chuck claws for grasping the workpiece, and
wherein controlling points of the respective chucks are arranged on a circumference of an imaginary circle drawn with the rotational axis as a center in a plan view, and grasping directions of the chucks are oriented to be substantially parallel with tangential directions at the controlling points on the imaginary circle, respectively.

8. The robot of claim 7, wherein the chucks are arranged at equal intervals on the circumference of the imaginary circle.

* * * * *